United States Patent
Thandiwe et al.

[19]

[11] Patent Number: 6,144,186
[45] Date of Patent: Nov. 7, 2000

[54] LOW POWER ENABLE CIRCUIT

[75] Inventors: Iilonga Thandiwe, Atlanta; Ron Torrence, Suwanee; James L. Estes, Jr., Lawrenceville, all of Ga.

[73] Assignee: Motorola, Inc., Shaumburg, Ill.

[21] Appl. No.: 09/356,389

[22] Filed: Jul. 16, 1999

[51] Int. Cl.[7] .......................... H01M 10/46; H01M 10/44
[52] U.S. Cl. ............................. 320/134; 320/136
[58] Field of Search ................................ 320/127, 128, 320/134, 136, 158, 163, FOR 150, FOR 153, DIG. 22

[56] References Cited

U.S. PATENT DOCUMENTS 4,709,202  11/1987  Koenck et al. .
5,563,496  10/1996  McClure .
5,633,573   5/1997  Van Pituoc et al. .
5,965,997  10/1999  Alwardi et al. .

*Primary Examiner*—Edward H. Tso
*Attorney, Agent, or Firm*—Philip H. Burrus, IV

[57] ABSTRACT

This invention is a system and method for causing a rechargeable battery pack to enter a low power mode. The system includes a resistive divider, a switch, a battery cell, and a safety integrated circuit. When an external voltage is applied to the resistive divider, the switch turns on. With the switch on, the safety integrated circuit senses only a fraction of the cell voltage and therefore puts the battery pack into a low power, or sleep mode. The battery is returned to normal mode by connecting a charger to the battery pack.

6 Claims, 2 Drawing Sheets

LOW POWER ENABLE CIRCUIT

TECHNICAL FIELD

This invention relates generally to rechargeable batteries and more specifically to lithium based rechargeable batteries with safety circuits.

BACKGROUND

As electronic circuits are becoming smaller and more integrated, an increasing number of portable products are becoming available. Portable computers and cellular telephones, for instance, are new devices that are growing in popularity. These devices rely upon batteries for mobility. Typically, it is more cost effective to operate such devices with a rechargeable battery pack. While a rechargeable battery may store less energy than does a single use battery, rechargeable batteries can be recharged hundreds of times, thereby providing a less expensive long term solution.

Just as portable computer and cellular phone technology advances, so does the technology associated with rechargeable battery packs. Circuits that measure battery energy storage, known as fuel gauge circuits, are becoming common place. There is also a heightened awareness of safety, and safety circuits are therefore being integrated into battery packs. The safety circuits are especially applicable to lithium based batteries, as strict voltage and current limits must be observed to reduce any potential safety hazards.

Designers of battery packs are becoming concerned with the current drain demanded by the complex circuitry contained within a battery pack. Current drawn within a battery pack reduces the energy available to the host electronic device. An especially pressing concern is the amount of current drain that occurs between the time a battery is manufactured and the time when it is first charged by a consumer. During this time, which could be months, the circuitry in the battery pack is generally consuming energy. This energy consumption causes battery discharge. If the charge level decreases too much, a condition known as over-discharge, the life cycle capacity of the battery will be reduced. At extreme over-discharge, the battery pack will be damaged and will then not store energy. This is particularly true in lithium based battery packs.

There are two obvious solutions to this problem of battery discharge after manufacture and before customer charge. First, the manufacturer can charge the battery to maximum capacity prior to warehouse storage and subsequent shipment. This is expensive, however, as it requires time, equipment, and personnel.

Second, the designer of the battery pack can use low power dissipation devices. However, this is also expensive, as it generally requires custom parts designed specifically for batteries. Such parts often ship in low volumes and are therefore expensive.

There is therefore a need for a means to address the problem of battery current drain between the time of manufacture and the time of delivery to an end customer.

SUMMARY OF THE INVENTION

This invention is a novel system for putting a rechargeable battery pack with a safety circuit into a sleep or hibernate mode. Many off the shelf safety integrated circuit devices are available which go into a low power, or sleep, mode when the voltage of any cell falls below a threshold level. This invention offers a means of simulating a low cell threshold sleep by applying an external voltage source. The battery pack is thereby put into sleep mode until an external charger is applied by the end user.

DETAILED DESCRIPTION OF THE INVENTION

This invention solves the problems associated with battery pack current drain occurring between the time of manufacture and the time of first charging by the end user. The invention does this by providing a circuit capable of placing the battery pack in a low power, or sleep, mode. In the sleep mode, power consumption is greatly reduced, thereby conserving battery energy. The battery is returned to normal operation when the end user places the battery in a charger.

Figure 1:
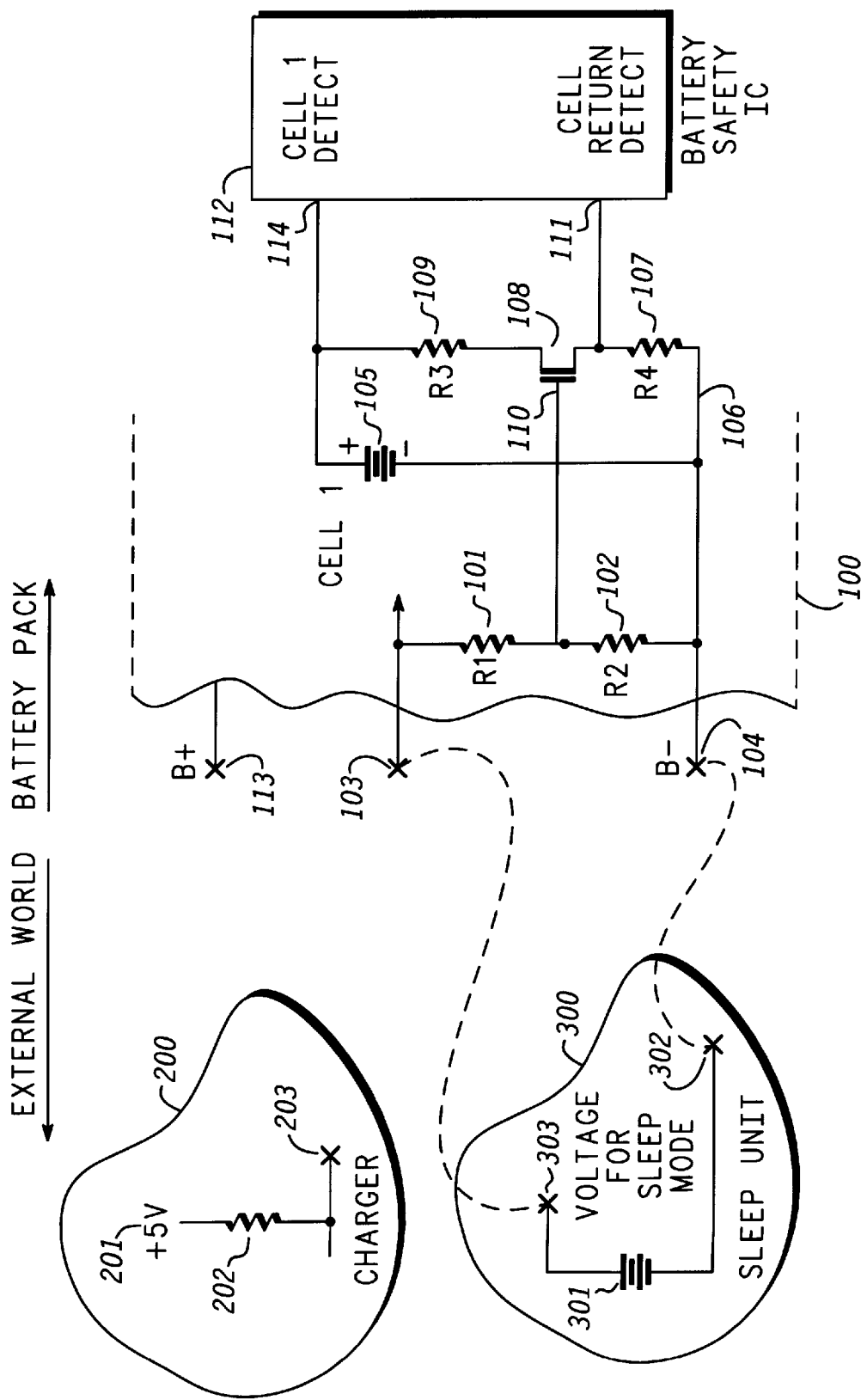
FIG. 1 shows a schematic diagram of a battery pack capable of being put into a sleep mode in accordance with the invention.

Referring now to FIG. 1, a battery pack 100 in accordance with the invention is shown. The sleep circuit is comprised of the resistor divider formed by R1 101 and R2 102, the switch S1 108, the resistors R3 109 and R4 107, the safety integrated circuit (safety IC) 112, the thermistor terminal 103, and the return terminal 104. Additionally shown are an external power source 300 containing a voltage source 301, and a host unit 200 with a pull up resistor Rpullup 202 and internal voltage source 202.

Figure 2:
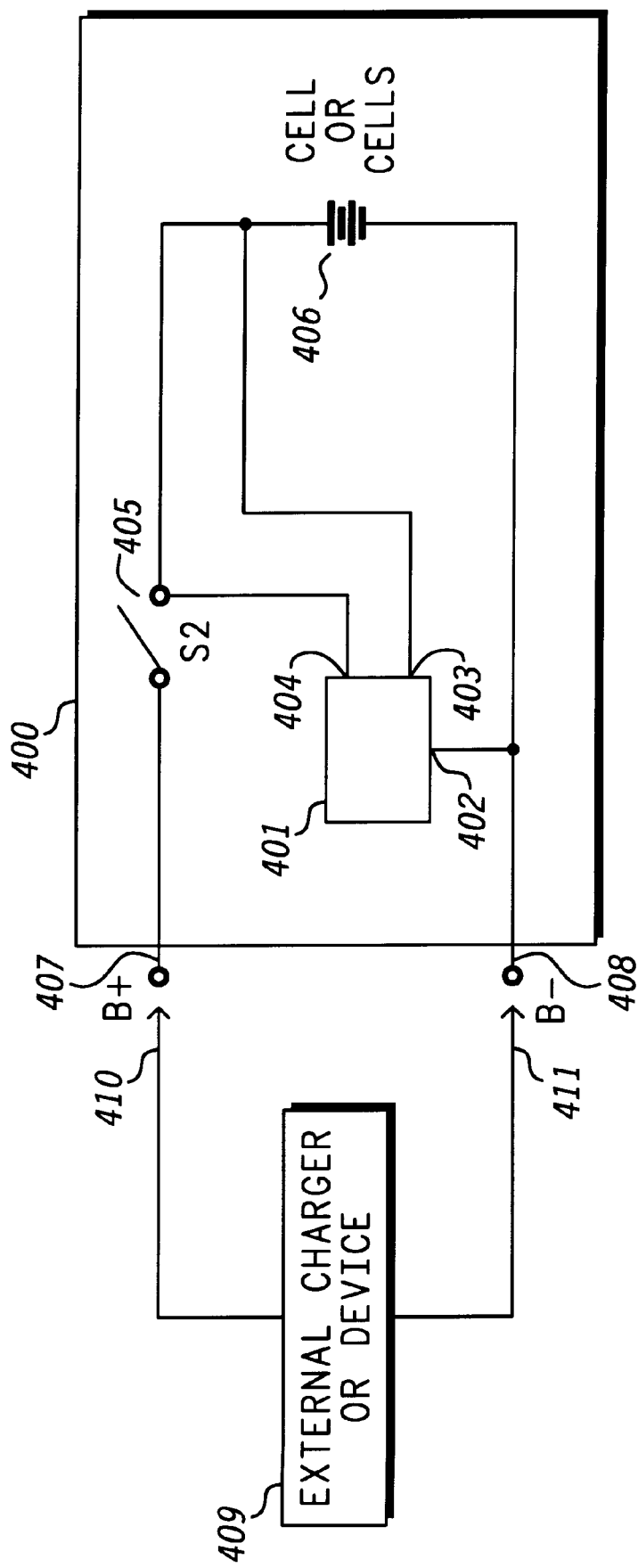
FIG. 2 shows a simplified schematic of a battery pack with a safety integrated circuit included.

In order to better understand the invention, one must be familiar with lithium ion safety circuits. Lithium ion safety ICs are application specific integrated circuits designed primarily for sensing the voltage and current applied to rechargeable lithium cells. Common safety ICs used in industry include the BQ2058 series safety IC manufactured by Benchmarq and the S-8244 series safety IC manufactured by Seiko. Such a circuit is shown in FIG. 2 in simplified form. While the BQ2058 will be used for the purposes of discussion, there are numerous others that work in an equivalent fashion.

Shown in FIG. 2 is a battery pack 400 with external terminals 407 and 408, and a lithium battery protection circuit comprising the safety IC 401 having a battery voltage sense line 403 and a switch control line 404. A power switch 405 is shown, as is at least on rechargeable cell 406. Also shown is an external device 409 with terminals 410 and 411. The external device could be either a charger or host device.

The operation of the safety circuit is as follows: Under normal conditions, i.e. no over-charge or over-discharge, the safety IC 401 keeps the power switch S2 405 closed, providing a conductive path from the external terminals 407 and 408 to the cells 406. In the event that the voltage of any cell 406 exceeds a predetermined threshold for a predetermined amount of time, the safety IC 401 opens the power switch 405, thereby preventing overcharge. The power switch 405 remains open until the safety IC 401 senses that all cells 406 have fallen below a charge enable threshold. At that time, the safety IC 401 closes the power switch 405.

The safety IC 401 also opens the power switch 405 when the cell 406 voltage falls below a predetermined threshold for a predetermined amount of time, thereby preventing over-discharge. The safety IC 401 keeps the power switch 405 open until a charger 409 is applied to the external terminals 407 and 408. It is important to note, that other circuitry, microprocessors, fuel gauges, and the like, with the battery pack are not powered when the power switch 405 is open. As the other parts do not consume power in this mode, the condition is therefore known as sleep mode or low power mode. An example of low power a low power mode would be consumption of 5 mA, when the circuit under normal operation consumes 10 mA.

Now refer back to FIG. 1. Today's rechargeable battery packs typically have several external terminals, including a positive terminal, negative terminal, thermistor terminal, pack identification (ID), and the like. FIG. 1 shows three such terminals, namely B+ 113, which is the battery pack voltage output, B− 104, which is the return line, and a third terminal 103 which could either be an ID terminal or thermistor terminal. The third terminal 103 is a signal level terminal, which means that the signals that appear on this terminal are generally less than 5 volts.

The safety IC 112 monitors the voltage of each cell in the pack. Cells can be arranged in parallel or in series. Two of the sensing terminals 114 and 111 are connected to one of the cells. As noted earlier, if the voltage across this cell drops below a predetermined threshold, the pack goes into sleep mode until a charger is connected.

After the battery pack is manufactured, it can be put into sleep mode as follows: A sleep unit 300 that includes a high potential, i.e. greater than 5 volts, voltage source 301 is connected to the battery pack. The positive terminal 303 of the sleep unit 300 is connected to the signal terminal 103 of the battery pack 100, and the return terminal 302 of the sleep unit 300 is connected to the return terminal 104 of the battery pack 100. When the sleep unit 300 is connected to the battery pack 100 in this fashion, a voltage appears at the midpoint of the resistor divider formed by R1 101 and R2 102. This voltage is connected to the gate 110 of the MOSFET (metal oxide semiconductor field effect transistor) transistor comprising the switch S1 108. The voltage applied to the gate is high enough to cause S1 108 to turn on.

When S1 108 turns on, the voltage that appears at the Cell 1 return detect terminal 111 of the safety IC 112 is no longer B−, but is instead a fractional voltage of Cell 1 105 formed by the effective resistor divider of R3 109 and R4 107. The safety IC 112 therefore senses a voltage that is below the sleep threshold and puts the battery pack 100 in sleep mode. The sleep unit 300 can then be removed and the battery pack 100 stays in sleep mode until a charger is connected to the B+ and B− terminals.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been cast as with a resistive divider formed by R1 and R2 connected to a thermistor or battery pack ID (identification) line, the resistors could be connected to any terminal that is not either B_ or B−. Additionally, while the switch S1 is a MOSFET, any other switching means, including bipolar transistors, relays and the like, would suffice as equivalent substitutions.

What is claimed is:

1. A system for placing a rechargeable battery pack in a low power mode, the system comprising:
    A) a rechargeable battery pack having at least one rechargeable battery cell, a voltage output terminal and return terminal, and at least one signal terminal;
    B) a resistor divider consisting of a first resistor and a second resistor coupled between the signal terminal and the return terminal;
    C) a third resistor, a switch, and a fourth resistor coupled in series between at least one rechargeable battery cell and the return terminal, with the switch coupled to the resistor divider; and
    D) an integrated safety circuit for sensing the voltage of at least one rechargeable battery cell, the integrated safety circuit having at least one voltage sensing terminal coupled to at least on rechargeable battery cell, and having a return sensing terminal coupled to the fourth resistor;
    wherein when a predetermined voltage is applied between the signal terminal and the return terminal, the switch closes, causing the battery safety integrated circuit to put the battery pack in low power mode.

2. A system as in claim 1, further wherein the battery pack is placed in normal mode by electrically connecting a charger across the voltage output terminal and the return terminal.

3. A system as in claim 2, wherein the switch comprises a metal oxide semiconductor field effect transistor.

4. A system as in claim 2, wherein the switch comprises a bipolar junction transistor.

5. A system as in claim 2 wherein the switch comprises a relay.

6. A method for placing a battery pack into a low power mode, the method comprising:
    A) providing rechargeable battery pack having at least one rechargeable battery cell, a voltage output terminal and return terminal, and at least one signal terminal;
    B) providing a resistor divider consisting of a first resistor and a second resistor coupled between the signal terminal and the return terminal;
    C) providing a third resistor, a switch, and a fourth resistor coupled in series between at least one rechargeable battery cell and the return terminal, with the switch coupled to the resistor divider; and
    D) providing a battery safety integrated circuit for sensing the voltage of at least one rechargeable battery cell, the safety integrated circuit having at least one voltage sensing terminal coupled to at least on rechargeable battery cell, and having a return sensing terminal coupled to the fourth resistor;
    whereby applying a voltage across the signal terminal and the return terminal causes the battery pack to enter a low power mode, and
    whereby applying a voltage across the voltage output terminal and the return terminal causes the battery pack to enter a normal mode.

\* \* \* \* \*